US010901441B2

(12) United States Patent
Lin et al.

(10) Patent No.: US 10,901,441 B2
(45) Date of Patent: Jan. 26, 2021

(54) CONTROLLER FOR PROVIDING RESISTANCE VALUE CONTROLLING POWER USAGE IN A TEMPERATURE CONTROLLER

(71) Applicants:En Ke Yu Co., Ltd., Taipei (TW); Liang-Tse Lin, New Taipei (TW); Hao-Che Hsieh, Taipei (TW)

(72) Inventors: Liang-Tse Lin, New Taipei (TW); Hao-Che Hsieh, Taipei (TW)

(73) Assignees: EN KE YU CO., LTD., Taipei (TW); Liang-Tse Lin, New Taipei (TW); Hao-Che Hsieh, Taipei (TW)

( * ) Notice: Subject to any disclaimer, the term of this patent is extended or adjusted under 35 U.S.C. 154(b) by 0 days.

(21) Appl. No.: 16/196,914

(22) Filed: Nov. 20, 2018

(65) Prior Publication Data

US 2020/0159264 A1 May 21, 2020

(51) Int. Cl.
*G05B 15/02* (2006.01)
*G05D 23/24* (2006.01)
(Continued)

(52) U.S. Cl.
CPC ............... *G05D 23/24* (2013.01); *G01K 7/16* (2013.01); *G05D 23/1928* (2013.01); *G05B 15/02* (2013.01)

(58) Field of Classification Search
CPC ...... G05D 23/1928; G05D 23/24; G01K 7/16; G05B 15/02
See application file for complete search history.

(56) References Cited

U.S. PATENT DOCUMENTS 4,095,740 A * 6/1978 Wirth ................. G05D 23/1904
236/47
4,557,317 A * 12/1985 Harmon, Jr. ........ G05D 23/1902
165/201
(Continued)

FOREIGN PATENT DOCUMENTS

CN 2483747 Y 3/2002
CN 102226566 A 10/2011
(Continued)

*Primary Examiner* — Michael D Masinick
(74) *Attorney, Agent, or Firm* — Birch, Stewart, Kolasch & Birch, LLP

(57) ABSTRACT

A control device, comprising an environmental sensor, an electrical quantity sensor, a control operating unit, and a resistance output unit. The control operating unit connects to the environmental sensor, the electrical quantity sensor, and the resistance output unit. The resistance output unit additionally connects to a temperature controller to replace original resistive temperature sensor. The resistance output unit outputs a first resistance to the temperature controller so that a controlled device operates at a first power state. The resistance output unit also can output a second resistance to the temperature controller so that another controlled device operates at a second power state. When the control operating unit reads environmental information or time information, the resistance output unit outputs the first resistance or the second resistance after calculating by the control operating unit so that the controlled device operates at the first power state or the second power state.

14 Claims, 11 Drawing Sheets

(51) Int. Cl.
      *G05D 23/19*     (2006.01)
      *G01K 7/16*      (2006.01)

(56) References Cited

U.S. PATENT DOCUMENTS

| | | | |
|---|---|---|---|
| 10,001,292 B2 * | 6/2018 | Sullivan | F24F 11/30 |
| 2005/0134469 A1 * | 6/2005 | Odorcic | F24C 7/087 |
| | | | 340/661 |
| 2005/0268628 A1 * | 12/2005 | Thompson | F25B 30/02 |
| | | | 62/176.5 |
| 2016/0139188 A1 * | 5/2016 | Harary | G01R 21/133 |
| | | | 702/61 |
| 2017/0089604 A1 * | 3/2017 | Sullivan | F24F 11/30 |

FOREIGN PATENT DOCUMENTS

| | | |
|---|---|---|
| CN | 204678605 U | 9/2015 |
| JP | 2006-313653 A | 11/2006 |

\* cited by examiner

| sense temperature | original temperature controller | | device of the present invention | |
|---|---|---|---|---|
| | resistance output from sensor | device operation current | resistance output of the resistance provider | device operation current |
| T0 | VR0 | 0 | VR0 | 0 |
| T1 | VR1 | current 1 | VR0 | 0 |
| T2 | VR2 | current 2 | VR1 | current 1 |
| T3 1st mode | VR0+VR1 | current 3 | VR1 | current 1 |
| T4 2nd mode | VR0+VR2 | current 4 | VR2 | current 2 |
| T5 | VR0+VR1+VR2 | current 4 | VR0+VR1 | current 3 |

2 interval

FIG. 3C

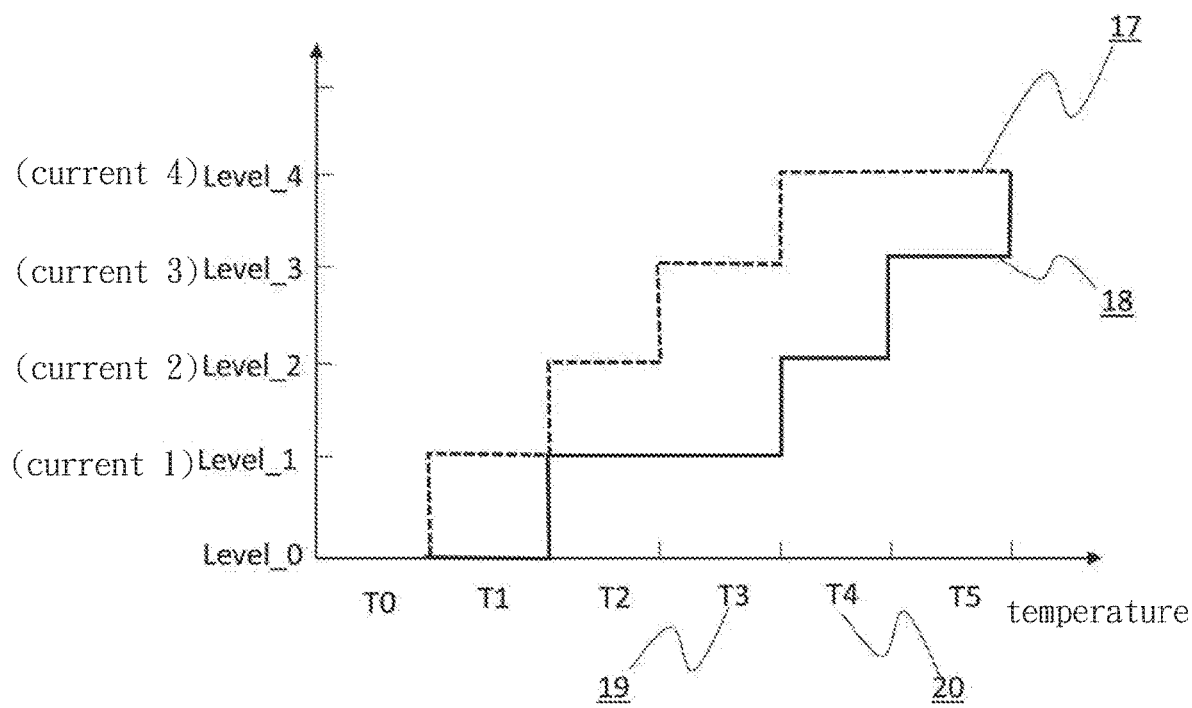

FIG. 3D

| sense temperature | original temperature controller | | device of the present invention | |
|---|---|---|---|---|
| | resistance output from sensor | device operation current | resistance output of the resistance provider | device operation current |
| T0 | R0=VR0 | 0 | R0=VR0 | 0 |
| T1 | R1=(VR0+VR1)/2 | current 1 | R0=VR0 | 0 |
| T2 | R2=VR1 | current 2 | R1=(VR0+VR1)/2 | current 1 |
| T3 1st mode | R3=(VR1+VR2)/2 | current 3 | R1=(VR0+VR1)/2 | current 1 |
| T4 2nd mode | R4=VR2 | current 4 | R2=VR1 | current 2 |
| T5 | | current 4 | R3=(VR1+VR2)/2 | current 3 |

FIG. 4C

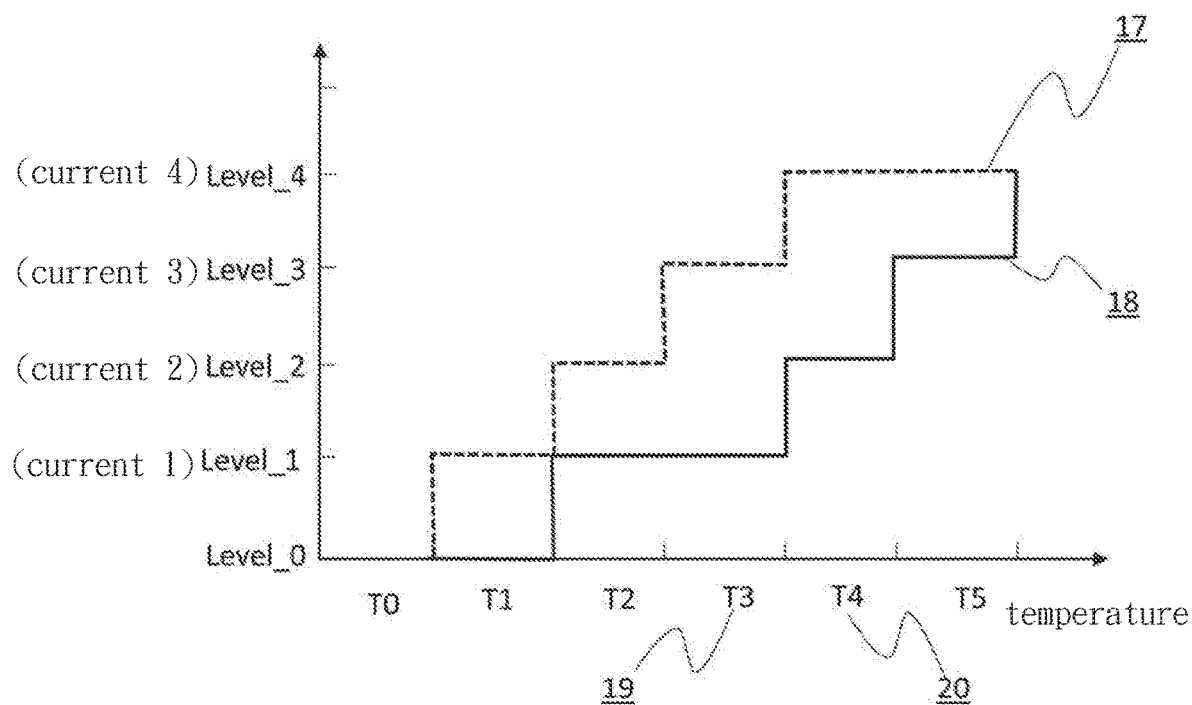

FIG. 4D

| input of operation controller | | resistance output by resistance provider | current of the heater |
|---|---|---|---|
| detection signal of water temperature | water flow | | |
| 0℃ - 20℃ | <10CMH | R4 | current 4 |
| 0℃ - 20℃ | >10CMH | R4 | current 4 |
| 20℃ - 30℃ | <10CMH | R2 | current 2 |
| 20℃ - 30℃ | >10CMH | R3 | current 3 |
| above 30℃ | <10CMH | R0 | current 0 |
| above 30℃ | >10CMH | R1 | current 1 |

| input of the operation controller | | resistance output of the resistance provider | current of the heater |
|---|---|---|---|
| time intervals | electric power demand | | |
| 7:00~8:00 | 100KW | R4 | current 4 |
| 8:00~9:00 | 200KW | R3 | current 3 |
| 9:00~10:00 | 300KW | R2 | current 2 |
| 10:00~11:00 | 400KW | R1 | current 1 |
| 11:00~12:00 | 500KW | R0 | current 0 |

CONTROLLER FOR PROVIDING RESISTANCE VALUE CONTROLLING POWER USAGE IN A TEMPERATURE CONTROLLER

FIELD OF INVENTION

The present invention is related to a controller and a control method; more specifically, to a controller and control method being able to change the device controlled by temperature controller.

BACKGROUND

In the conventional heating, ventilation and air conditioning (HVAC) device, heat providing devices or heat removing devices such as air conditioner, central air conditioner, heat pump are being set by people using the temperature controller on the devices. The temperature controller proceeds the device operation control according to the change of input resistance from the temperature sensor. In one words, the conventional air-conditioning device compares and decides the operation of the controlled device according to the resistance of the temperature sensor through the temperature controller and the resistance corresponded to the temperature set in the temperature controller, as shown in FIGS. 1A and 1B.

However, the conventional temperature controller do the regulation only in accordance to temperature, without considering other environment parameters such as temperature, humid, wind speed, wind direction, or time. The temperature controller can not calibrate the setting actively according to season and environment condition, and the controlled device like the HVAC device or the heat pump can not work in the most economical efficient or most comfortable conditions, and causing unwanted energy waste or discomforts.

Otherwise, when changing the setting or manner of controlling the operation of the controller such as controlling according to power demand, so as to replace or integrate the temperature controller and making the controlled device taking the set power demand as the control parameter reference, the conventional device using the resistance of the temperature sensor as input control of the temperature controller will endure very high risk and cost durning the modification and replacement without knowing the condition of safety control device of the controller.

Also, temperature setting function on the temperature controller is changing the set corresponded resistance during the operation of the controlled device and the temperature sensor, precise control the operation of the controlled device becomes even difficult.

Further, because this temperature controller can only proceed the logic operation and control according to the temperature sensor on the device, integration other environment information as reference of control or adding additional control functional can be expensive, without affecting the protection function condition.

SUMMARY

According, one of the objects of the present invention is to provide a controller making controlled device operating under specific output power or electric usage by providing resistance signal to the temperature controller, so as to change setting and operation of the controlled device while retaining the condition of the protection device.

Another object of the present invention is to provide a controller being able to extend or change the application of the controlled device or its operation reference such as power demand control, humid control, or setting different temperature, making the original temperature controller to indirectly control the controlled device according to the specific resistance generated from the environment information.

Still another object of the present invention is to provide a controller being able to make original temperature controller to extend or modify original controlled device according to time information, so as to operate under the purpose of timing control. Yet another object of the present invention is to provide a controller being able to make original temperature controller to control the controlled device operating under the purpose of specific output power or electric usage, such as power saving control, cost saving control, at specific timing according logic operation or prediction of environment or time information.

The controller includes environment sensor or time counter, electrical charge indicator, operating controller, resistance provider. The operating controller is connected to the environment sensor or time counter, electrical charge indicator; the resistance provider is connected to the operating controller. In addition, the resistance provider is connected to the temperature controller. The resistance provider generates a first resistance to the temperature controller, so as to operate the controlled device in the first electrical power usage mode; the resistance provider generates a second resistance to the temperature controller, so as to operate the controlled device in the second electrical power usage mode. After the operating controller calculated the information from the environment sensor or the time counter, the resistance provider outputs the first or second resistance to the temperature controller, so as to operate the controlled device operate under the first or second electric power usage.

Another object of the present invention is to provide a control method being adapted to control the controller above. By outputting specific resistance signal to temperature controller, the method changes the operation of the controlled device into the specific electric usage mode, and after the operation controller calculated the information from the environment sensor or time counter, the operation controller controls the resistance provider to generate a indicated resistance signal to the temperature controller, so as to operate the controlled device in the indicated output power or electric usage mode, and achieve energy saving or specific purpose and effect.

The control method includes the following steps:
(S1) outputting first resistance to temperature controller, so as to operate the controlled device in first electric usage mode;
(S2) outputting second resistance to temperature controller, so as to operate the controlled device in second electric usage mode;
(S3) acquiring the current environment information or time information;
(S4) calculating the environment information or the time information and output the first resistance or the second resistance to temperature controller; and
(S5) detecting the power usage of the controlled device.

The control method further includes following steps:
(S5-1) after outputting the first resistance, determining the electric power usage being close to the first electric power usage or away from the first electric power usage; if the values are close, back to step (S3); if the values are away from each others, back to step (S1); or after outputting the second resistance, determining the electric power usage being close to the second electric power usage or away from the first electric power usage; if the values are close, back to step (S3); if the values are away from each others, back to step (S1).

Additional features and advantages of the present invention will be describe and become more obvious in the following description, or they can be found through practice. The other purpose and advantage of the present invention can be realize and achieve through the structures described in the description, the claims and the additional schema.

BRIEF DESCRIPTION OF THE DRAWINGS

FIG. 3A-3D are schematic view of resistance providers connected in series of the example of the present invention.

FIG. 4A-4D are schematic view of resistance providers connected in parallel of the example of the present invention.

DETAILED DESCRIPTION OF THE PREFERRED EMBODIMENTS

Figure 1A:
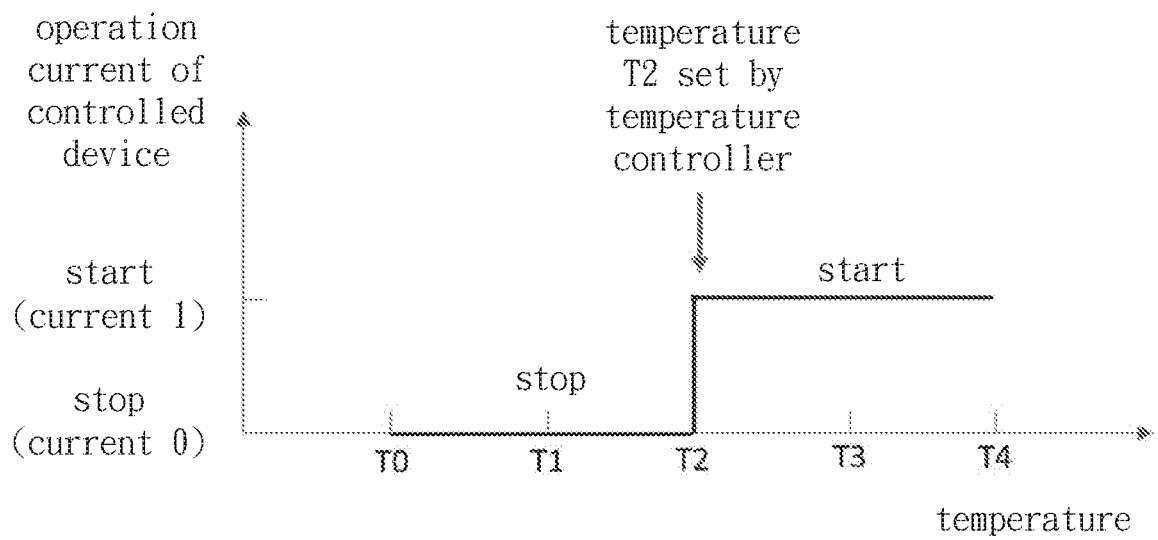
FIGS. 1A and 1B are the comparison diagram between the resistance corresponded to the set temperature of the conventional temperature controller and the electric power usage of the controlled device.
Figure 1B:
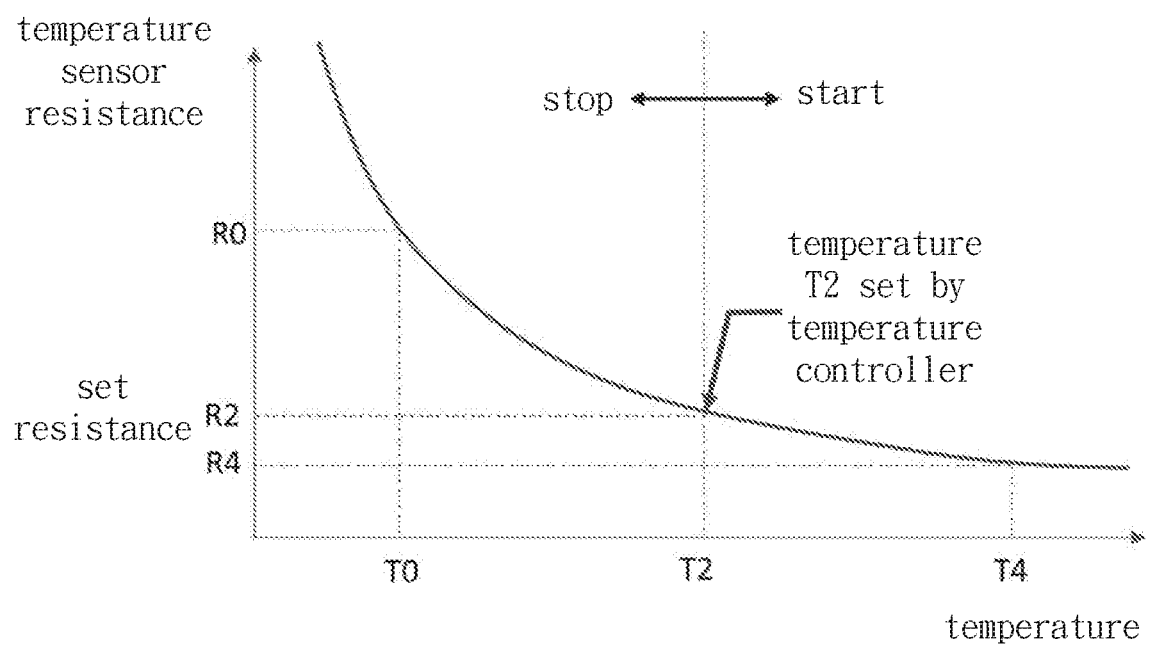
Figure 2A:
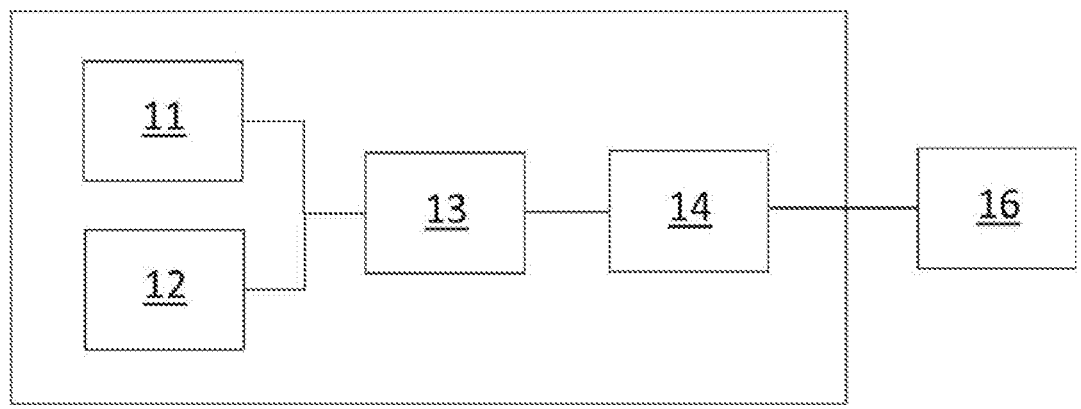
FIG. 2A is a block diagram of the controller of the example of the present invention inputting by the environment information unit.

Please refer to FIG. 2A, the controller of the present invention includes environment sensor 11, electrical charge indicator 12, operation controller 13, resistance provider 14. The resistance provider 14 is additionally connected to the temperature controller 16. In detail, the resistance provider 14 is connected to connecting point of existing inner temperature detector (not shown). Temperature controller 16 can be a commonly used temperature control, wherein the original inner temperature detector is replaced by environment sensor 11, utilizing as controlling temperature or other targets.

Figure 2B:
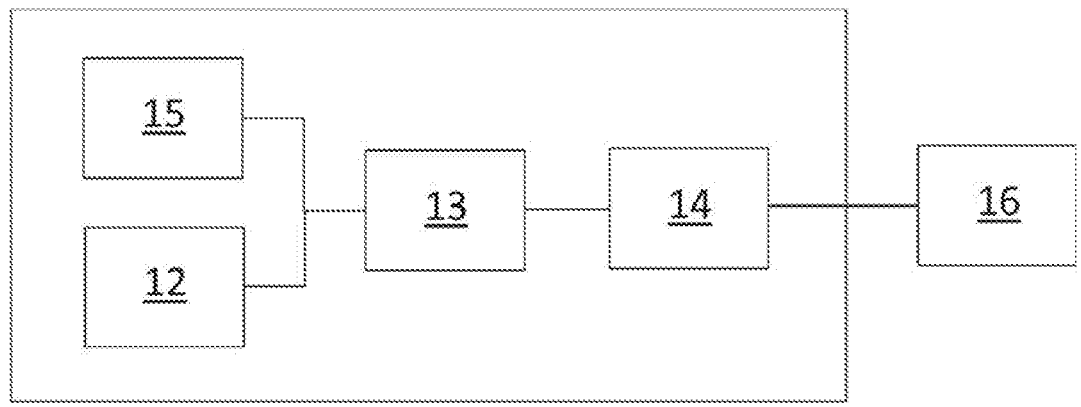
FIG. 2B is a block diagram of the controller of the example of the present invention inputting by the time counted information.

Also, please refer to FIG. 2B, the controller of the present invention includes time counter 15, electrical charge indicator 12, operation controller 13, resistance provider 14. The time counter 15, electric charge indicator 12, and the resistance provider 14 are electrical connected to the temperature controller 16; in detail, connected to the existing connection point of inner temperature detector (not shown) in the temperature controller 16. Temperature controller 16 can be a commonly used temperature control, wherein the original temperature control function inside is replaced by timer or other application of control purpose, and the environment information input can be added for application of complex control purpose.

Figure 2C:
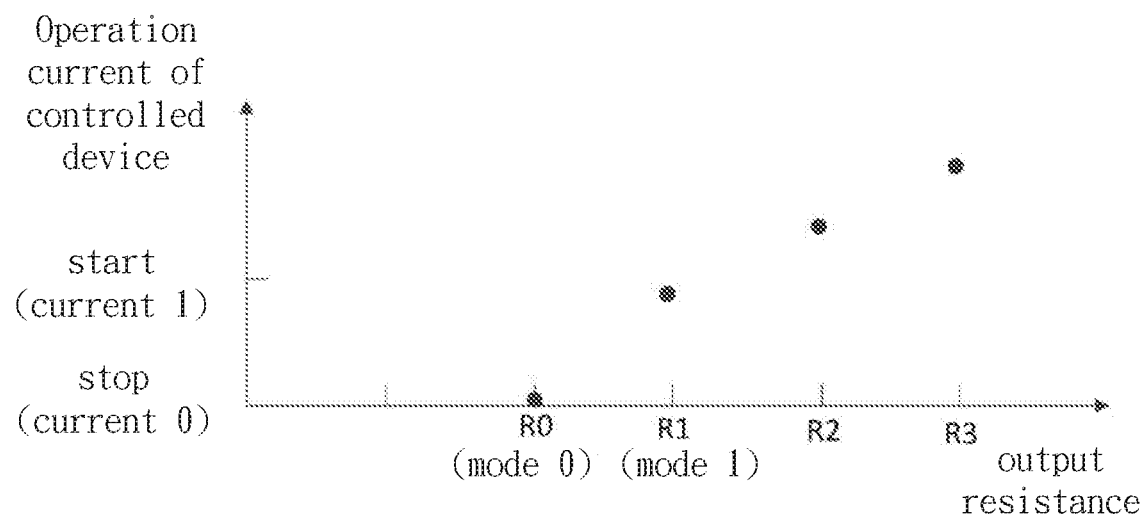
FIG. 2C is a diagram of relationship between electric power usage of controlled device, temperature controller and output resistance.

The operation controller 13 control the resistance provider 14 to output first resistance R0 to temperature controller 16, and measuring electric power usage of the controlled device (not shown) with the electric charge indicator 12, which is indicated as current 0 here, but the invention is not limited to the current information; operation controller 13 further controls the resistance provider 14 to provide second resistance R1 to temperature controller 16, and measuring electric power usage of the controlled device (not shown) with the electric charge indicator 12, which is indicated as current 1 here. The operation controller 13 is acquiring relationship between the output first resistance and the current 1, and the relationship between the output second resistance and the current 2, as shown in FIG. 2C. The resistance provider 14 of the present invention can output with calibrated, combined resistor, and the operation controller 13 read the electric power usage of the electric charge indicator 12, so as to calculate, analyze, record relationship between output resistance and the electric power usage of the controlled device. Therefore, the operation controller 13 can automatically recognize and record the corresponding relationship between the electric power usage of the controlled device and the output resistance. In one word, the controller of the example has self-learning function.

The environment sensor 11 of the example is, for example, a resistance temperature detector for mainly detecting current environment temperature, but the invention is not limit thereto. In other embodiment, detector can detect one of the temperature, humid, pressure, flow velocity, flow rate, wind speed, illuminance, volume, voltage, current, resistance, frequency, rotation speed or the combined signal thereof. In this example, the electric charge indicator 12 detects current, but the invention is not limit thereto, and signals related to electric power calculation are applicable. The signal input can be analog (resistance, current, voltage), digital, pulse, or code of electric signal, the invention is not limit thereto.

The operation controller 13 can be Central Processing Unit (CPU), Micro Control Unit (MCU), or other device alike, and, preferably, it can be a process being able to process logic operation. The resistance provider 14 is preferably formed of resistor and relay, and the relay can function as switch, regulating the resistance output from resistance provider 14. The resistor can be common conventional fixed or variable resistor, and providing different combined resistance through the open and close of the relay. The resistance provider 14 can be one or multiple, and the present invention is not limit thereto.

Since, in this example, operation status of the device is determined by electric power (such as current) measurement and resistance variation, and requiring no measurement and comparison of resistance of temperature detector on the original temperature controller 16, operation current and power output of the controlled device at every temperature can be precisely controlled through the output of resistance provider. Therefore, in other embodiment, when the controlled device is set with multiple temperature, or multiple starting devices (such as compressor), or frequency changing device, the controller of the example can be applied. In practice, the set objective can be alternated to demand of time or electric power.

Figure 3A:
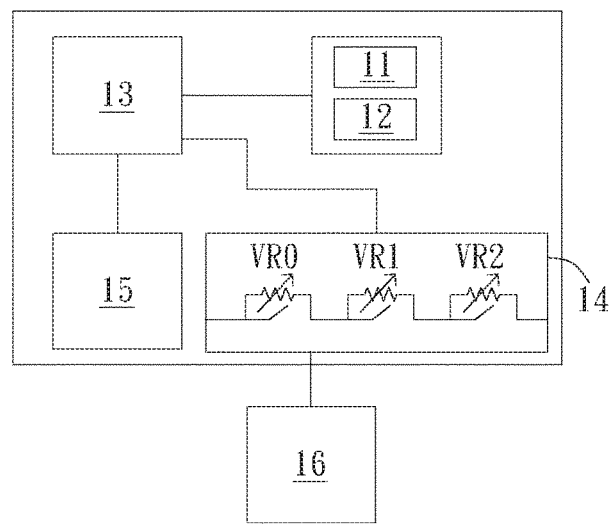
Figure 3B:
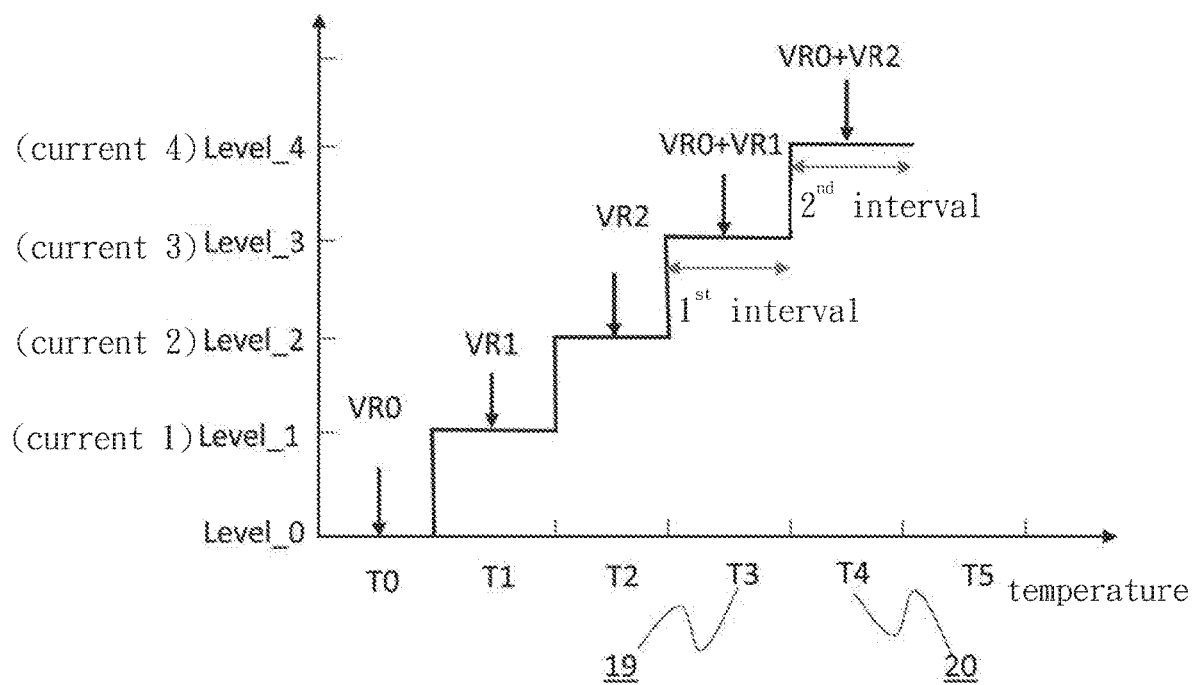

Controller of the another example of the present invention is referred to FIG. 3A-3D. The frame of hardware are mostly similar to the above examples, but the resistance provider 14 of the example is exemplified by resistors connected in series, such as the first resistor VR0, the second resistor VR1, and the third resistorVR2 connected in series. When the operation controller 13 controls the resistance provider 13 to output resistance signal VR0, VR1, VR2, VR0+VR1, or VR0+VR2 to temperature controller 16, the electric power usage of the controlled device measured by the electrical charges indicator can will be current 0, current 1, current 2, current 3, or current 4 respectively, which means the operation matches the set digram of resistance-current of the original temperature controller 16 as shown in FIGS. 3B and 3D. When the input signal (such as temperature) read by the operation controller 13 from the environment sensor 11 is in the first mode 19 shown in figure (regarding as locating in the gap of first resistance, which is shown as first gap in figure), the input resistance to the original temperature sensor (not shown) of the original temperature controller 16 is VR0+VR1, so as to operate the controlled device to generate the electrical power usage and power output according to current 3. Meantime, the operation controller 13 read the temperature from the environment sensor 11 and control the resistance provider 14 to output resistance VR1 to the temperature controller 16, and the controlled device (not shown) controlled by the temperature controller 16 will switch to operation using power of current 1, as the curve 18 shown in FIG. 3D.

In addition, while in the second mode 20 (regarding as locating in the second resistance gap, which is shown as second gap in the figure), input resistance from the temperature controller 16 of the original temperature sensor (not shown) is VR0+VR2, so as to operate the controlled device with the electric power usage of current 4. Meantime, the operation controller 13 controls resistance provider 14 to output resistance VR2 to temperature controller 16 after reading temperature from environment information sensor 11, and the controlled device (not shown) controlled by the temperature controller 16 switches to operate using electric power of current 2, as the curve 18 shown in FIG. 3D. This example achieves more comparison between operation graph of controlled device under more control parameters of temperature controller and the graph and resistance signals of the original temperature controller, as shown in FIGS. 3C and 3D.

It should be noted that this example explains the operate and control method in two conditions, but the invention is not limited to this two conditions, more resistance signal composition can be added to increase the number of operation modes.

Figure 4A:
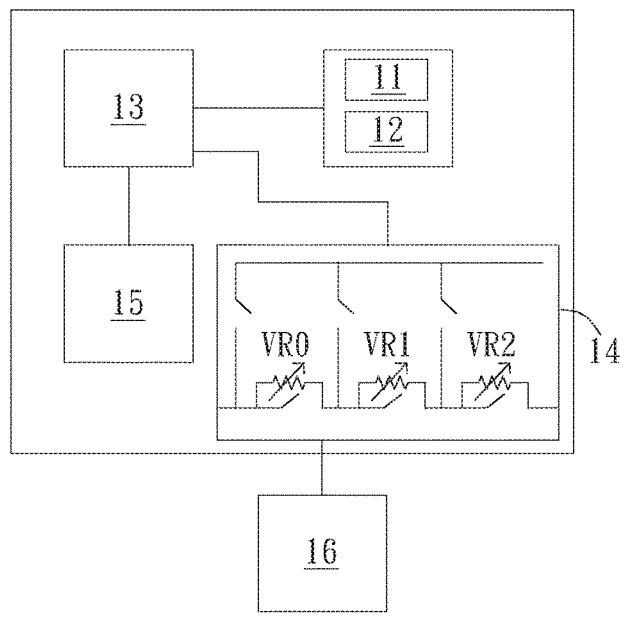
Figure 4B:
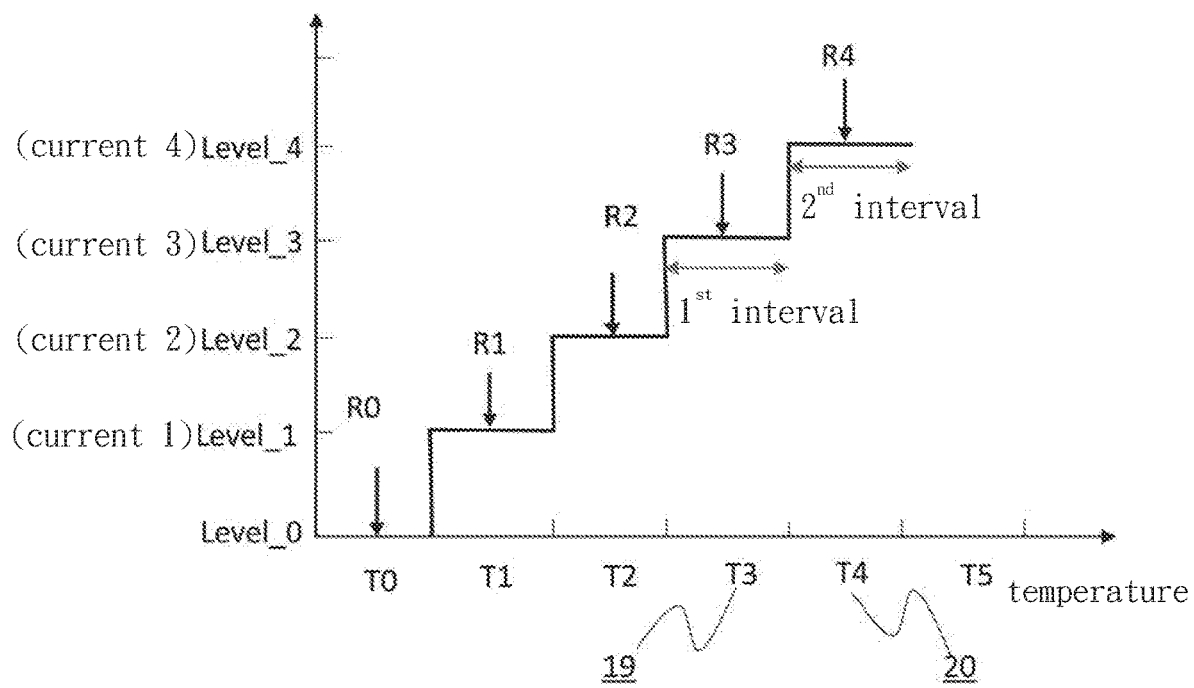

Controller of another example of the present invention refers to FIG. 4A-4D. The frame of hardware are mostly similar to the above examples, but the resistance provider 14 of this example are exemplified by multiple resistances connected in parallel, as shown in FIG. 4A, wherein the first resistor VR0, the second resistor VR1, and the third resistor Vr2 are connected in parallel. When the resistance provider 14 output resistance signal R0, R1, R2, R3, or R4 to the temperature controller 16, the electric power usage of the controlled device measured by the electrical charges indicator is current 0, current 1, current 2, current 3, or current 4, as shown in the curve 17 in FIGS. 4B and 4D.

When the input signal from the environment sensor 11 is temperature, as the first mode shown in figure, the original temperature sensor (not shown) of the temperature controller 16 input resistance R3, so as to operate the controlled device in the electric power and power output of current 3. Operation controller 13 controls the resistance provider 14 to output resistance R1 to the temperature controller 16 after reading temperature from environment sensor 11, and, at the mean time, controlled device (not shown) of the temperature controller 16 switches to operate with current 1 electric power usage, as the curve 18 shown in FIG. 4D.

In addition, at the second mode, the original temperature sensor (not shown) of the temperature controller 16 output resistance R4, so as to operate the controlled device to operate with electric power of current 4. Operation controller 13 controls resistance provider 14 to output resistance R2 to the temperature controller 16 after reading temperature from the environment sensor 11, and, at the meantime, controlled device (not shown) of the temperature controller 16 switches to operate with current 2 electric power usage, as the curve 18 shown in FIG. 4D. The detail comparison between the curves and the resistance signals is shown in FIGS. 4C and 4D, and this example explains operation and control method of two modes, but the invention is not limited to this two modes and variety combination of resistance signals quantity or connection in series and parallel can be added to increase modes of control.

Figure 5A:
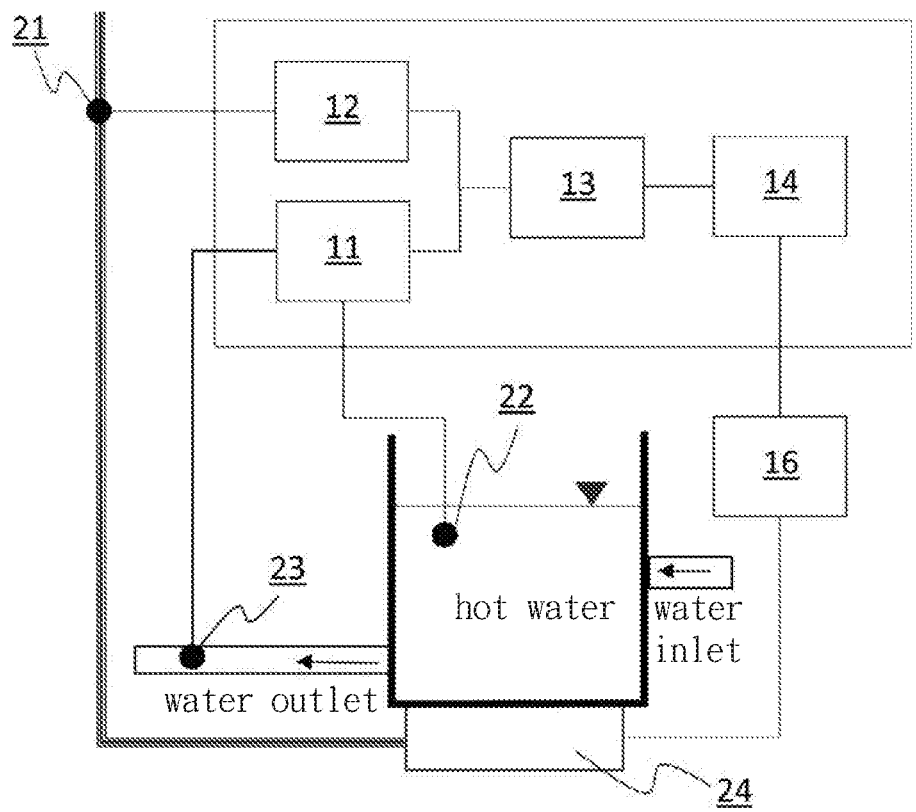
FIG. 5A-5C are schematic view of controller of another example of the present invention.
Figure 5B:
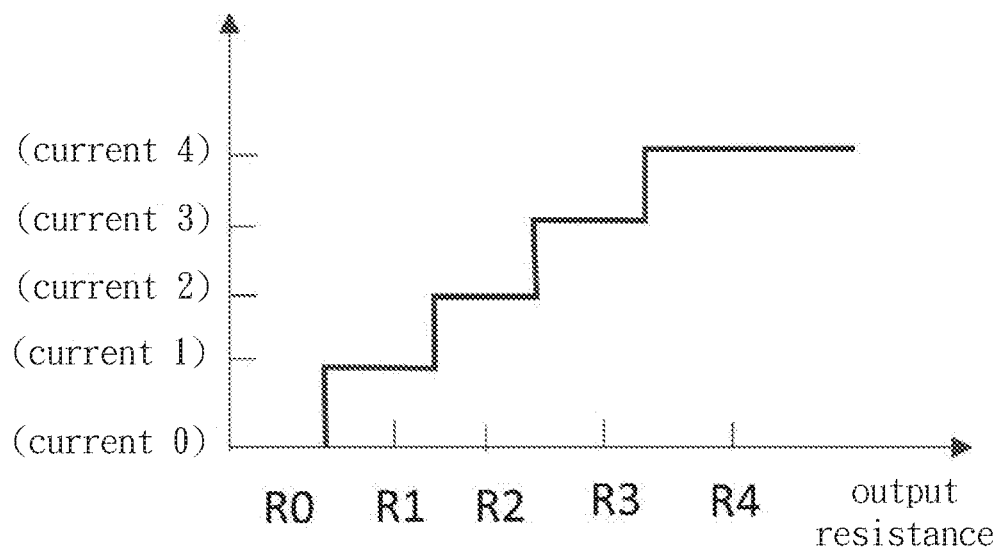

Another example of the present invention is device operates by a temperature controller 16 controlling heater 24, which is input by environment sensors 11 such as temperature detector 22 and flow sensor 23, as shown in the system framework diagram in FIG. 5A. When the resistance provider 12 output resistance R0, R1, R2, R3, or R4 to temperature controller 16, current of the heater 24 detected by the electrical charge indicator 12 through current detector 21 are current 0, current 1, current 2, current 3, or current 4, and the relationship of analysis/records of the operation controller 13 is shown in FIG. 5B. When the operation controller 13 read input information from the environment sensor 11, resistance provider 14 is controlled to output corresponding resistance to the temperature controller 16 according to logic of FIG. 5C, so as to operate the heater according to set electric power usage and power output.

Figures 5C, 6A:
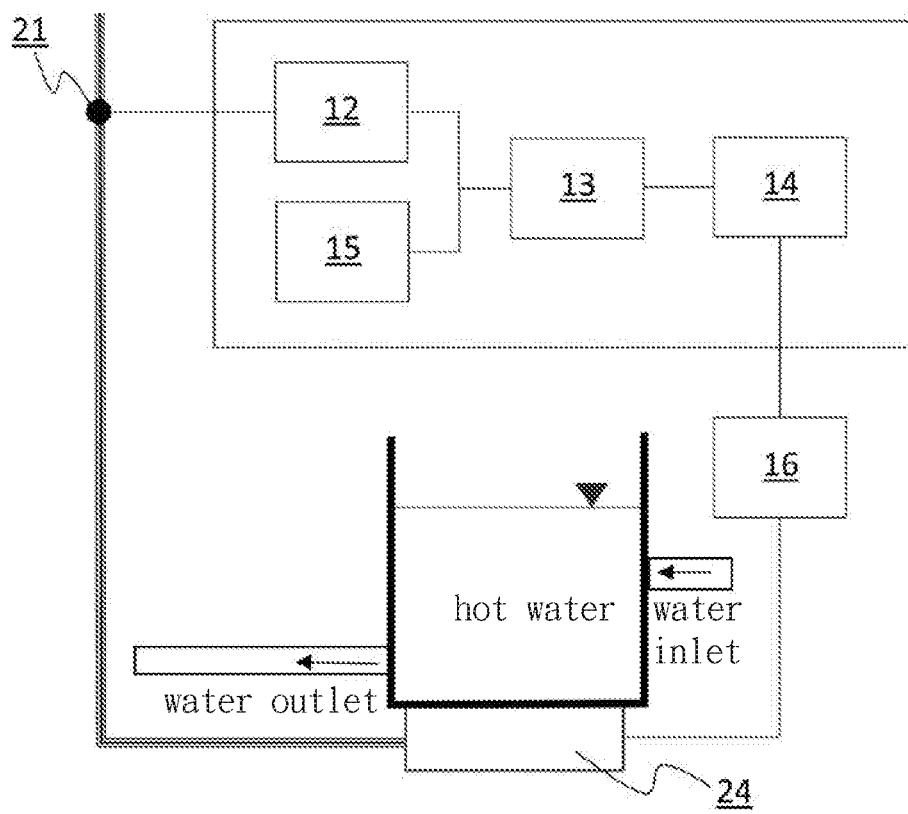
FIGS. 6A and 6B are schematic view of controller of another example of the present invention.
Figure 6B:
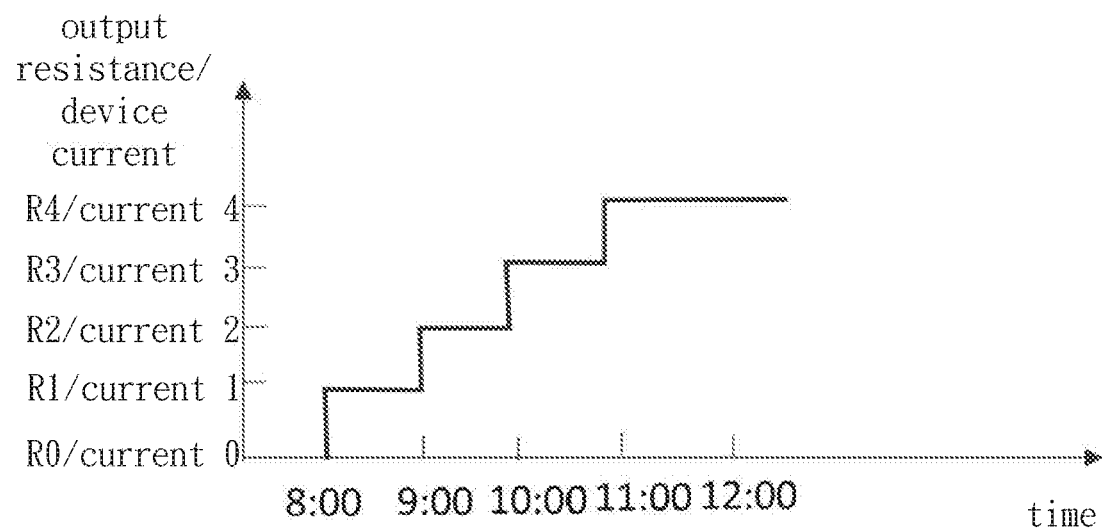

In another example of the present invention, the device is similar to the device of the above example, which is device using temperature controller 16 to control heater 24, and the time count information is the input, as shown in the framework diagram in FIG. 6A. When the resistance provider 14 outputs resistances R0, R1, R2, R3, or R4 to the temperature controller 16, the current of heater 24 detected by the electric charge indicator 12 through current detector 21 is current 0, current 1, current 2, current 3, or current 4, as shown in FIG. 6B. When the operation controller 13 read the time counter 15, controlling the resistance provider 14 to output corresponded resistance according to the logic of FIG. 6B, so as to operate the heat at the set time and electric power usage.

Figure 7A:
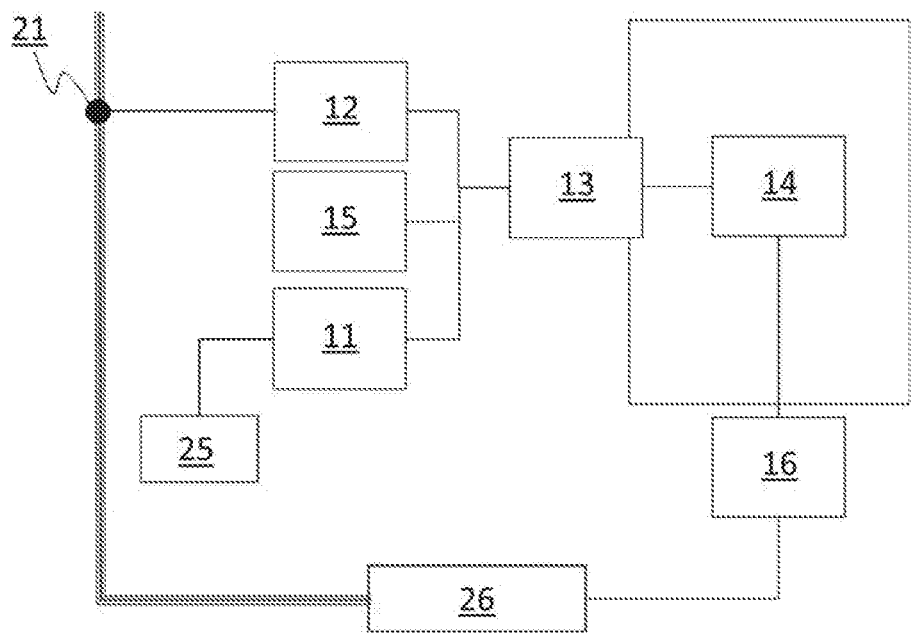
FIG. 7A-7C are schematic view of controller of another example of the present invention.
Figures 7B, 7C:
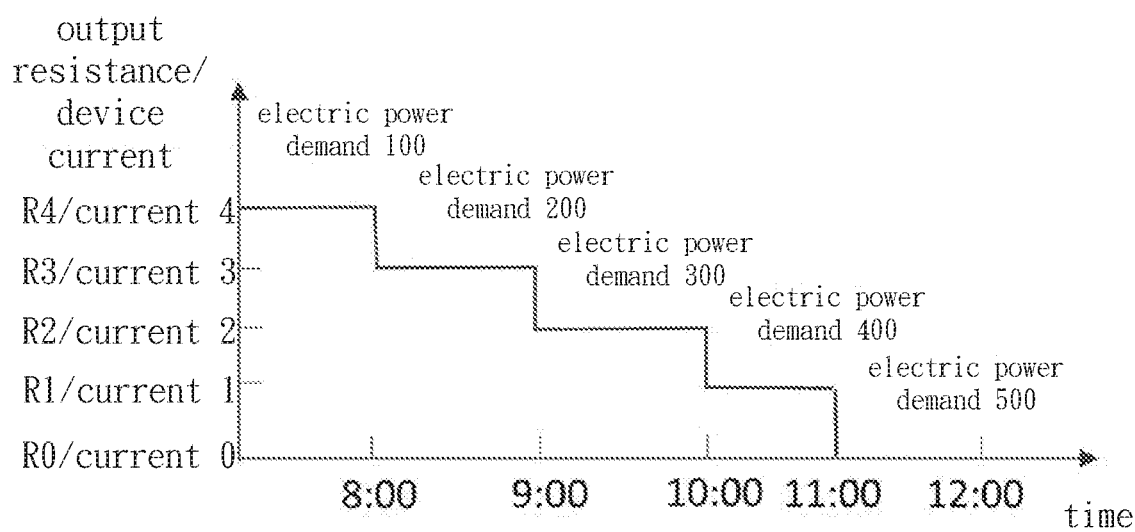

In another example of the present invention, the device is controlling air conditioner 26 through temperature controller 16, wherein the electric power usage of the electric charge indicator 25, the environment sensor 11, and the time counter 15 are inputting, as shown in the framework diagram in FIG. 7A. To be specific, when the resistance provider 14 output resistance R0, R1, R2, R3, or R4 to the temperature controller 16, the operation current of the air conditioner 26 detected by the electric charge indicator through current detector 21 is current 0, current 1, current2, current 3, or current 4, and recording by the operation controller 13, as shown in FIG. 7B. The operation controller 13 controls the resistance provider 14 to output resistance according to the time and electric power demand logic in FIG. 7B, so as to operate the air conditioner 26 according to the logic of set time and electric power usage as shown in FIG. 7C.

It should be noticed that, in the above examples, the time counter 15 is functioned as measuring, keeping, or indicating time, and the controller of the present invention added time counting operation controlling function to the original controller, and the set principle and the self-learning functions are the same as the above examples, and no further details are provided here. In other examples, environment sensor 11 is further able to combine as operation controller 13 to input calculation and determination control.

Figure 8:
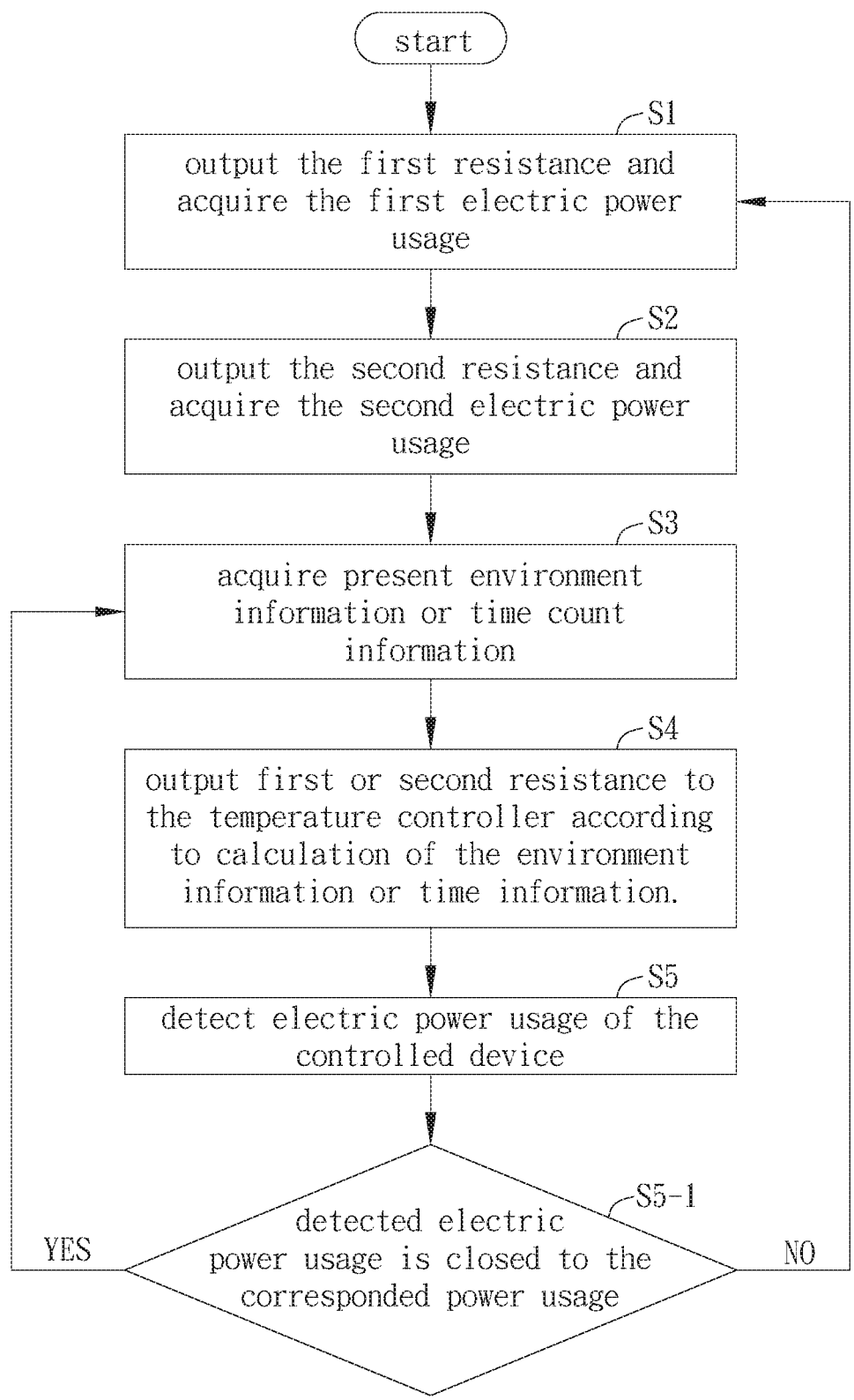
FIG. 8 is a flow chart of the control method of the controller of the example of the present invention.

Another example of the present invention refers to FIG. 8. FIG. 8 illustrates a control method being adapt to control the controller of the present invention, wherein the method includes the following steps: (S1) outputting the first resistance to the temperature controller, so as to operate the controlled device with the first electric power usage; (S2) outputting the second resistance to the temperature controller, so as to operate the controlled device with the second electric power usage; (S3) acquiring the present environment or time information; (S4) outputting the first or the second resistance to the temperature controller after calculating the environment information or time information; (S5) detect the electric power usage of the controlled device.

The control method of the example is achieved by the device with the hardware structure of the above mentioned examples, wherein the detail structure and principle are described, and no further details are provided here. However, it should be noticed that, the following explains situation in practical when an user input some parameter and output the corresponding resistance, and the detected current from controlled device is not corresponded there to. For example, the method determines the detected electric power usage is closed to or away from the first power usage after the first resistance is input. If it's close, then back to step (S3), otherwise back to step (S1) if it's away from. Also, the method determines the detected electric power usage is closed to or away from the second power usage after the second resistance is input. If it's close, then back to step (S3), otherwise back to step (S1).

It should be noticed that, the above mentioned being close or away from the first/second electric power usage mean definitions of relatively close or away. For example, in step (S5-1), being close to the first electric power usage means absolute value of difference between electric power usage detected by the electric charge indicator and the first electric power usage of the step (S1) is less than the absolute value of the difference between the detected electric power and the second electric power usage of the step (S2).

On the other hand, the above mentioned being away from the first electric power usage means absolute value of difference between the detected electric power usage and the first electric power usage of the step (S1) is larger than the absolute value of the difference between the detected electric power and the second electric power usage of the step (S2).

Similarly, being close to the second electric power usage means absolute value of difference between detected electric power usage and the second electric power usage in step (S2) is less than the absolute value of the difference between the detected electric power usage and the first electric power usage in step (S1).

Being away from the second electric power usage means the absolute value of the difference between the detected electric power usage and the second electric power usage in step (S2) is larger than the absolute value of the difference between the detected electric power usage and the first electric power usage in step (S1).

Comparing to the conventional techniques, the controller and the control method of the present invention control the output of the temperature controller with a specific resistance signal, so as to operate controlled device with self-learning through electric power measurement and logic process, and precisely control the device according to the environment parameters and time count information, so as to achieve power saving and other specific purposes.

The invention claimed is:

1. A controller, including:
   an environment sensor configured to detect environmental information;
   an electrical charge indicator configured to measure the power usage of a controlled device controlled by a temperature controller;
   an operation controller connecting to the environment sensor and the electrical charge indicator; and
   a resistance provider connecting to the operation controller and the temperature controller, the resistance provider configured to provide a first resistance and a second resistance to the temperature controller to cause the controlled device generating a first power usage corresponding to the first resistance and a second power usage corresponding to the second resistance;
   wherein the operation controller controls the resistance provider according to the environmental information to provide one of the first resistance and the second resistance as an output resistance to the temperature controller to enable the controlled device to operate in the first power usage or the second power usage corresponding to the output resistance.

2. The controller as claim 1, wherein the resistance provider includes resistor and relay.

3. The controller as claim 1, wherein the resistance provider is set up in series form, parallel form, or the combination thereof.

4. The controller as claim 1, wherein the environment information detected by the environment sensor includes temperature, humidity, concentration, pressure, flow, flow rate, wind velocity, illuminance, volume, voltage, current, resistance, frequency, rotation speed, count, pulse, or the combination signal thereof, or a code of electrical signal.

5. The controller as claim 1, wherein the electrical charge indicator is a measuring device, or an indicator using communication input which calculates usage of electrical power, the communication input includes one of the analog signal, digital signal, and pulse signal, or electrical signal code.

6. A controller, including:
   a time counter configured to provide time information;
   an electrical charge indicator configured to measure the power usage of a controlled device controlled by a temperature controller;
   an operating controller, connected to the time counter and the electrical charge indicator; and
   a resistance provider, connected to the operating controller and the temperature controller, the resistance provider configured to provide a first resistance and a second resistance to the temperature controller to cause the controlled device generating a first power usage corresponding to the first resistance and a second power usage corresponding to the second resistance;
   wherein the operation controller controls the resistance provider according to the time information to provide to provide one of the first resistance and the second resistance as an output resistance to the temperature controller to enable the controlled device to operate in the first power usage or the second power usage corresponding to the output resistance.

7. The controller as claim 6, wherein the resistance provider includes resistor and relay.

8. The controller as claim 6, wherein the resistance provider is set up in series form, parallel form, or the combination thereof.

9. The controller of claim 6, wherein the time information provided by the time counter includes absolute time, relative time or the combination thereof, or an electrical signal code.

10. The controller of claim 6, wherein the electrical charge indicator is a measuring device, or an indicator using communication input which calculates usage of electrical power, the communication input includes one of the analog signal, digital signal, and pulse signal, or electrical signal code.

11. A control method of a controller including the following steps:
(S1) outputting a first resistance to a temperature controller, so as to control a controlled device to operate in a first power usage;
(S2) outputting a second resistance to the temperature controller, so as to control the controlled device to operate in a second power usage;
(S3) acquiring environment information or time information;
(S4) outputting one of the first resistance and the second resistance as an output resistance to the temperature controller according to the environment information or the time information to enable the controlled device to operate in a default power usage, wherein the default power usage is one of the first power usage and the second power usage corresponding to the output resistance.

12. The control method as claim 11, further includes the following steps:
(S5) detecting a current power usage of the controlled device; wherein
when the current power usage is close to the default power usage, back to step (S3); when current power usage is away from the default power usage, back to step (S1).

13. The control method as claim 12, wherein in the step (S5), when the absolute value of the difference between the current power usage and the default power usage is less than the absolute value of the difference between the current power usage and one of the first power usage and the second power usage which is not corresponding to the output resistance, the current power usage is close to the default power usage.

14. The control method as claim 12, wherein in the step (S5), when the absolute value of the difference between the current power usage and the default power usage is more than the absolute value of the difference between the current power usage and the one of the first power usage and the second power usage which is not corresponding to the output resistance, the current power usage is away from the default power usage.

* * * * *